United States Patent [19]

Bourcier et al.

[11] Patent Number: 5,137,673

[45] Date of Patent: * Aug. 11, 1992

[54] PROCESS FOR FORMING PLASTICIZED POLYVINYL BUTYRAL SHEET

[75] Inventors: David P. Bourcier, Ludlow; Robert A. Esposito, Amherst, both of Mass.

[73] Assignee: Monsanto Company, St. Louis, Mo.

[*] Notice: The portion of the term of this patent subsequent to Feb. 28, 2006 has been disclaimed.

[21] Appl. No.: 121,555

[22] Filed: Nov. 17, 1987

[51] Int. Cl.⁵ .................. B29C 47/04; B29C 47/90
[52] U.S. Cl. ........................ 264/151; 264/177.1; 264/178 R; 264/210.7; 264/281; 264/160; 264/245; 425/67; 425/377
[58] Field of Search ............... 264/40.7, 148, 150, 264/151, 160, 165, 167, 171, 177.1, 177.17, 177.19, 178 R, 209.3, 209.5, 210.7, 280, 281, 288.4; 425/376 A, 377, 67, 465, 466, 382.4

[56] References Cited

U.S. PATENT DOCUMENTS

| 2,423,147 | 7/1947 | Hinman | 264/129 |
|---|---|---|---|
| 2,767,432 | 10/1956 | Mooney | 425/377 |
| 2,937,407 | 5/1960 | Richardson | 264/160 |
| 3,019,475 | 2/1962 | Smith | 425/335 |
| 3,038,206 | 6/1962 | Eccles | 264/288.4 |
| 3,207,827 | 9/1965 | Kuehnle | 264/281 |
| 3,273,202 | 9/1966 | Zygan | 425/466 |
| 3,696,186 | 10/1972 | Stark et al. | 264/292 |
| 3,912,440 | 10/1975 | Koss et al. | 264/288.4 |
| 4,316,868 | 2/1982 | Esposito et al. | 425/462 |
| 4,554,713 | 11/1985 | Chabal | 425/366 |
| 4,627,804 | 12/1986 | Kobayashi et al. | 264/178 R |

FOREIGN PATENT DOCUMENTS

| 60759 | 9/1982 | European Pat. Off. | 264/230 |
|---|---|---|---|
| 1107926 | 5/1961 | Fed. Rep. of Germany | 425/376 A |

Primary Examiner—Jill L. Heitbrink
Attorney, Agent, or Firm—Michael J. Murphy; William J. Farrington

[57] ABSTRACT

Plasticized polyvinyl butyral sheet optionally containing a gradient color band is formed by continuously extruding a sheet having a predetermined region across its width formed from melt issuing from a die at an increased mass flow rate in comparison with other portions of the melt forming the rest of the sheet and then forwardly distorting such sheet immediately after forming by preferentially stretching the side containing the predetermined region to form an arcuate shape of substantially uniform thickness. Arcuately shaped sections are then cut from the sheet to form discrete, shaped interlayer blanks having improved thickness uniformity and dimensional stability providing improved performance when used in laminated safety glass.

7 Claims, 4 Drawing Sheets

PROCESS FOR FORMING PLASTICIZED POLYVINYL BUTYRAL SHEET

CROSS REFERENCE TO RELATED APPLICATIONS

1. "Process For Forming Shaped Interlayer Blanks", D. P. Bourcier, R. A. Esposito, Ser. No. 121,197 filed Nov. 17, 1987, now Pat. No. 4,808,357
2. "Apparatus For Forming Shaped Interlayer Blanks", D. P. Bourcier, R. A. Esposito, Ser. No. 121,546 filed Nov. 17, 1987, now Pat. No. 4,768,939.

BACKGROUND OF THE INVENTION

This invention relates to forming thermoplastic interlayer sheeting and more particularly to a method for forming discrete, shaped blanks of plasticized polyvinyl butyral suitable for laminated safety glass windshields.

Thin sheet formed of plasticized polyvinyl butyral is well known as an interlayer in laminated safety glass finding application in windows such as penetration-resistant automobile windshields. A very well known problem in view of many patents dealing with it since the first in the United States issued in 1952, is the performance deficiency in the interlayer when used in a specially curved and angled windshield. More specifically, sheet in such applications has traditionally been shaped in association with glass laminating downstream of sheet forming by stretching into a shape to match the desired windshield configuration. Special problems arise when the interlayer has a colored band along one margin which is intended to reduce glare from the sun when in place in the windshield. The band is usually graduated in color intensity with the greatest color along the upper peripheral portion of the windshield which then gradually diminishes to an almost imperceptible cutoff line at the lower edge of the band. When such gradient band windshield has horizontal and vertical curvature, as is usual with modern wrap around auto windshields, it has been necessary to stretch each sheet section to an arcuate shape before associating it with the glass so that after lamination the cut-off line of the band is parallel to the upper edge of the windshield. This amount of initial stretching compensates for the initial lack of curvature of the color band which if unstretched would produce a cut-off line not parallel to the upper edge of a curved, wrap-around windshield.

As well delineated in the prior art, for example col. 2, lines 3-28 of U.S. Pat. No. 4,244,997, stretching of sheet after its formation adversely affects its subsequent performance in a windshield. More specifically, differential stretching inherently results in thickness reduction and a buildup of strain unless relieved. Non-uniform thickness translates to variable impact resistance in the windshield, such resistance being lower in the area of reduced thickness. Uneven strain results in variable shrink-back and reduction in peripheral size of the sheet during handling before trapping it in place between layers during lamination. When this occurs the shaped blank must be discarded if it reverts to a smaller size than the glass sheets with which it is being laminated. Reheating sheet previously conventionally formed with a rough surface to facilitate deairing during lamination can prematurely undesirably reduce such roughness rendering it more susceptible to stack sticking in storage and less effective in allowing air to escape during lamination. Further, reheating and stretching sheet previously having predetermined levels of moisture carefully incorporated therein to help control its level of adhesion to adjoining glass layers can cause such moisture to flash out of the sheet. It would be desirable to provide a system for forming interlayer windshield blanks reducing or eliminating the foregoing plethora of shortcomings.

SUMMARY OF THE INVENTION

Now improvements have been made which overcome or diminish prior art shortcomings with respect to interlayer blanks for laminated safety glass windows.

Accordingly, it is a principal object of this invention to provide an improved method for forming interlayer blanks of plasticized polyvinyl butyral usable with glass in automotive windshields.

Another object is to provide such a method which uses heat in the polymer for initially forming the sheet to facilitate its shaping to fit a curved windshield.

An additional object is to provide during its manufacture an on-line method of shaping plasticized polyvinyl butyral sheeting into a curved configuration matching the contour of the windshield of which it will eventually be a component.

A further object is to provide a cut blank for a windshield or a building window having improved thickness uniformity and dimensional stability providing improved impact performance in a laminated glass assembly.

Other objects of this invention will in part be obvious and will in part appear from the following description and claims.

These and other objects are accomplished by providing a process for forming plasticized polyvinyl butyral sheet which comprises continuously forcing plasticized polyvinyl butyral melt through a slot to form a sheet, the mass flow rate of melt through one region of the slot being greater than through the remainder of the slot; and distorting the sheet into a curved shape of substantially uniform thickness having a different curvature along each edge while the melt continues to issue from the slot, the edge of greater curvature being formed from the region of the sheet formed from the melt issuing through the slot at the greater mass flow rate.

Though applicable to the formation of clear interlayer blanks, the process preferably includes the step of incorporating a colored stream of plasticized polyvinyl butyral into the melt upstream of the slot to produce a sheet having a gradient color band extending along one side.

BRIEF DESCRIPTION OF THE DRAWINGS

In describing the overall invention, reference will be made to the accompanying drawings wherein.

DETAILED DESCRIPTION OF THE INVENTION

Figure 1:
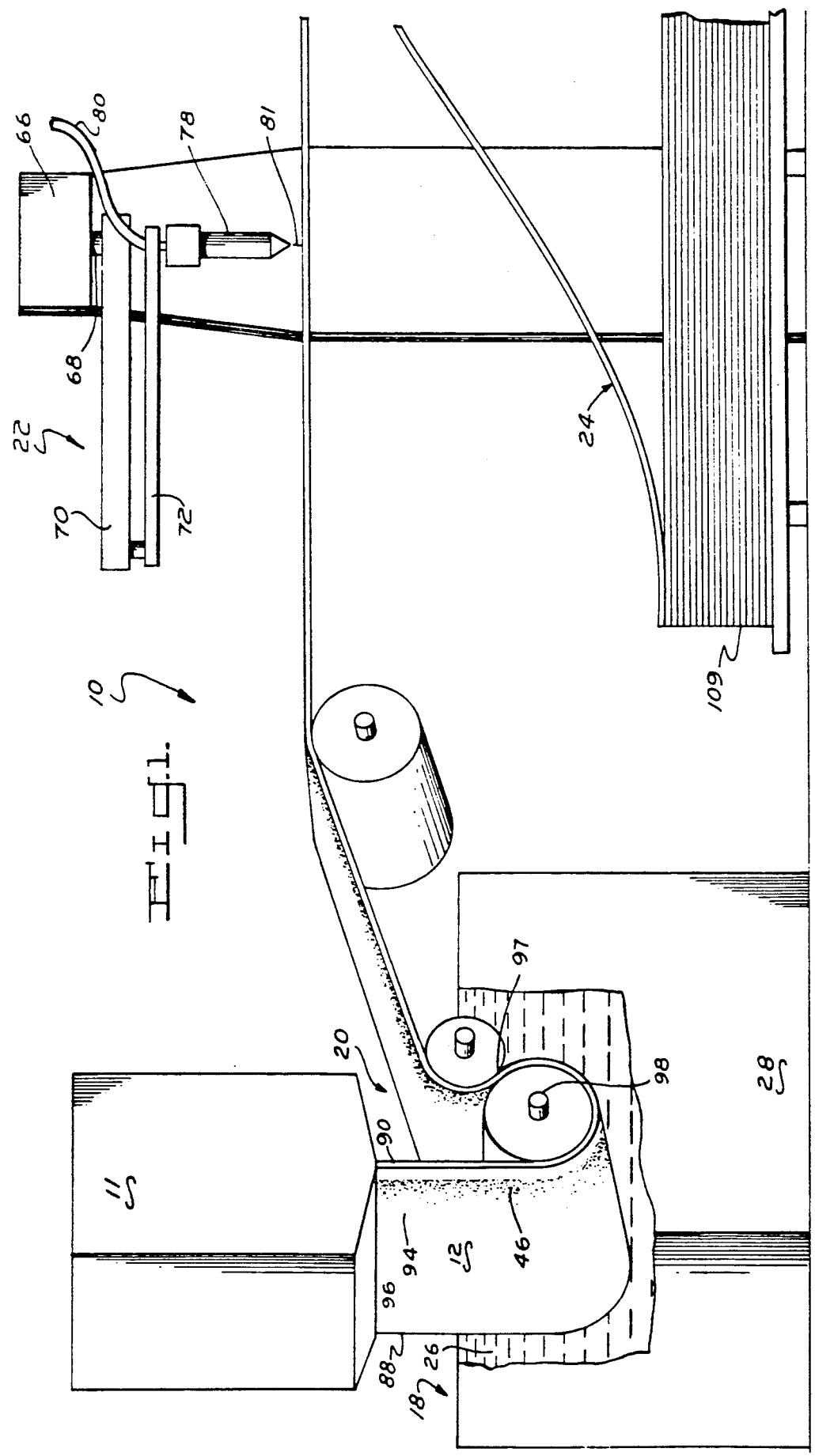
FIG. 1 is a schematic, elevational view of a system embodying the invention.
Figure 2:
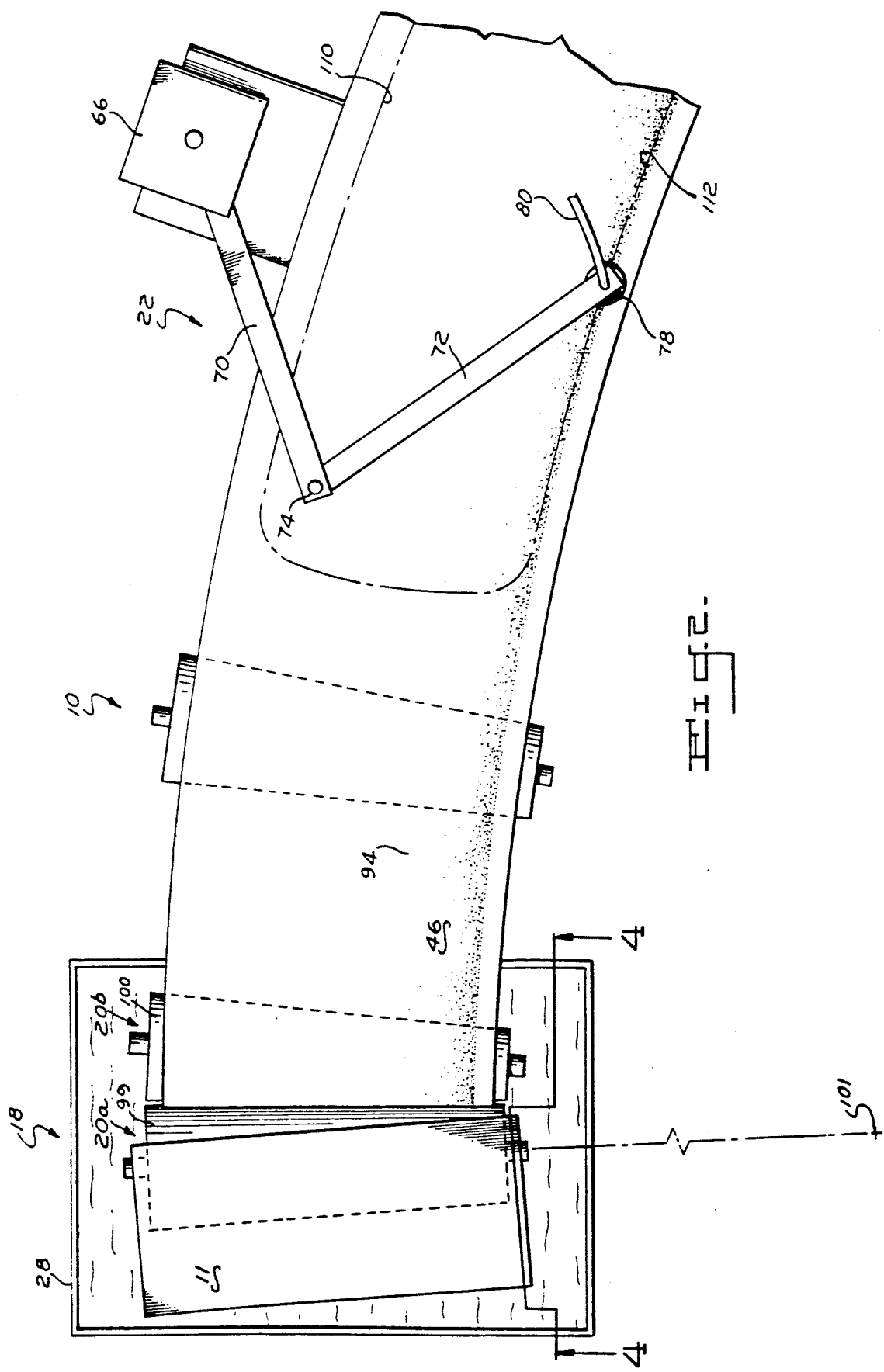
FIGS. 2 and 3 are each plan views of successive parts of the system of FIG. 1.
Figure 3:
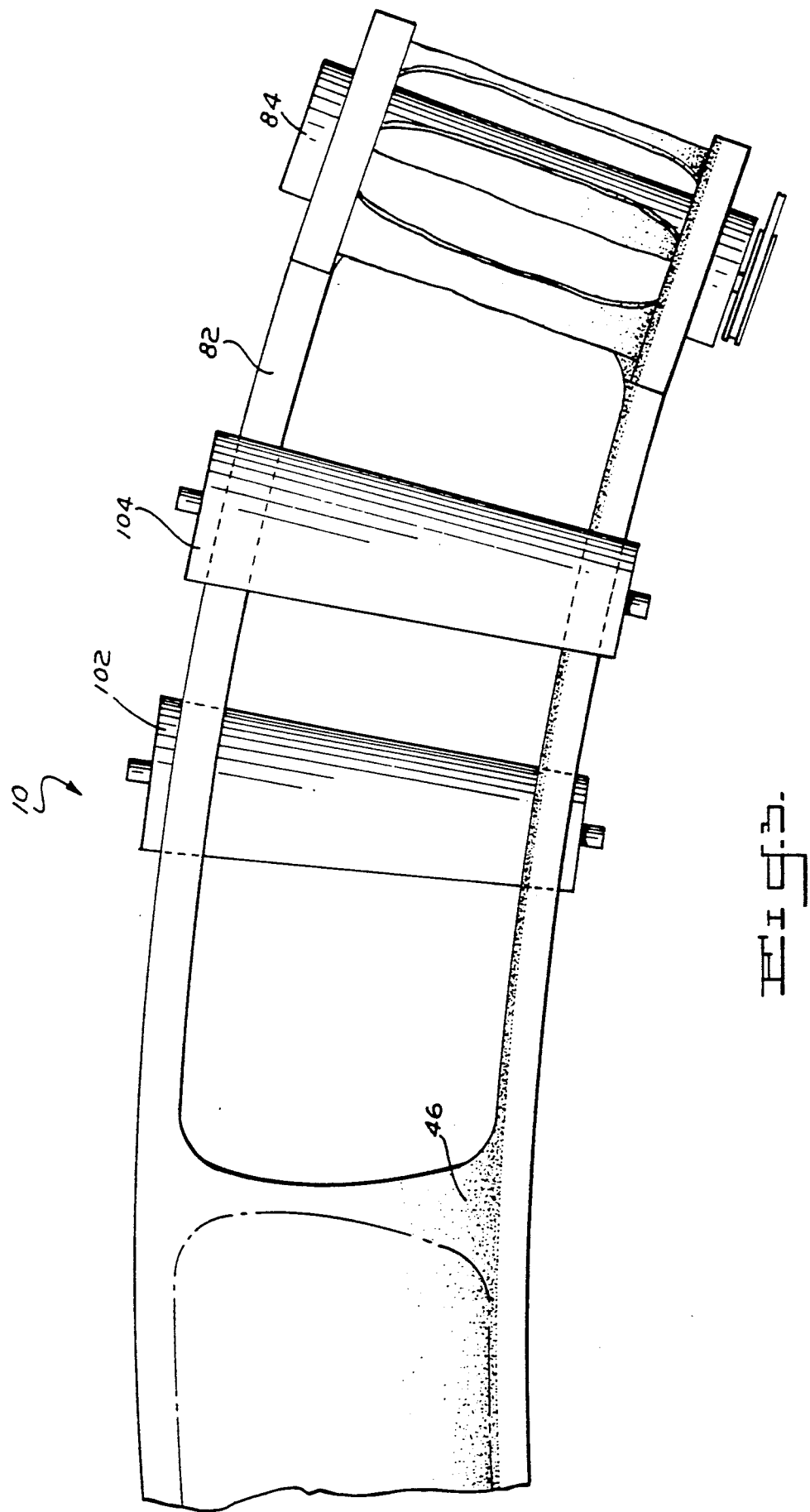

Referring now to the drawings, apparatus, collectively identified as 10, is shown in FIGS. 1-3 for forming discrete, shaped interlayer blanks. Apparatus 10 comprises extrusion shaping die 11 having slot 16 (FIG.

4) at its outlet for forming sheet 12 from plasticized polyvinyl butyral, means 14 (FIGS. 4, 5) associated with die 11 for causing a portion of the melt forming sheet 12 to exit slot 16 at a greater mass flow rate than remaining melt portions simultaneously exiting slot 16, means 18 (FIGS. 1 and 2) adjacent die 11 for quenching sheet 12 immediately after forming, frusto-conical pull rolls 20 (FIG. 4) for forwardly shaping sheet 12 into arcuate form, and cutting means 22 (FIGS. 1 and 2) beyond rolls 20 for repeatedly, successively cyclically severing quadrilateral sections out of shaped sheet 12 to form on each occasion a discrete, shaped, interlayer blank 24. (FIG. 1).

Means 18 for quenching sheet 12 comprises a cooling medium 26, which may be water, within tank 28 (FIGS. 1 and 4) below die 11 in which vertically lowermost frusto-conical pull roll 20a is at least semi-immersed. In place of or in addition to tank 28 and medium 26, a coolant conventionally controlled at a desired temperature could be circulated continuously through one or both rolls 20. In the illustrated embodiment, roll 20a has a conventional uncovered metal surface but, if desired, it may be covered with an appropriate material such as rubber or otherwise treated to promote frictional engagement with sheet 12. Roll 20a is rotatably mounted for turning movement by a conventional drive means operatively associated with drive shaft 98, not shown. Roll 20a peripherally engages (prior to conducting the process as will be described) cooperating, upper frusto-conical idler roll 20b (though it could also be driven), both such rolls defining nip 97 therebetween though which passes sheet 12 as will be described.

Die 11 (FIG. 4) is on the discharge end of a conventional extrusion system, not shown, comprising one or two screws turning within a casing for advancing plasticized polyvinyl butyral melt through cylindrical manifold 30 toward and through slot 16. Substantially parallel lips 32, 34 each have a preferably smooth land surface and together delimit and define slot 16. Approach passage 40 intercommunicates at one end with manifold 30 and converges at its forward end to slot 16.

Die 11 preferably includes a generally torpedo-shaped probe 42 (FIG. 4) within and affixed via supports 44a and 44b to the walls of manifold 30. Probe 42 is eccentrically offset just forward of manifold axis 45 toward approach passage 40 and has its long axis parallel to slot 16. Probe 42 contains an extrusion slot, not shown, parallel with its long axis for incorporating, upstream of slot 16, a colored stream of melt into the main melt stream forming sheet 12, to provide gradient color band 46 (FIG. 2) in and extending along one side of sheet 12. Further details of probe 42 are described in U.S. Pat. No. 4,316,868, col. 2, line 60 through col. 6 line 7, the content of which is incorporated herein by reference.

Means 14 (FIGS. 4, 5) associated with-die 11 for causing during extrusion a portion of the melt to exit slot 16 at a greater mass flow rate than remaining portions of the melt, comprises metal choke bar 47 slidably mounted within a slot 48 which extends crosswise across the full width of and parallel to slot 16 of die 11. Plural threaded positioning rods 49 are telescopically slidable in bores in die 11. Each rod 49 has a lower end 50 threadably secured to bar 47 and an upper end 52 within a coaxial bore extension in bracket 54 fixed to side surface 56 of die 11. Each rod 49 has an exposed threaded section along its length. Exposed threaded nut 57 may be manually rotated with wrench 58 along an associated threaded portion of each rod 49. When desired to locally change (for example to increase) the cross sectional opening in passage 40 beneath bar 47 relative to that of adjacent section(s) of such passage, one or more nuts 57 (such as 57a in FIG. 5) bearing against surface 59 of die 11 is turned to forcibly draw rod 49a outwardly, which, since rod 49a is secured at 60 to choke bar 47, causes bar 47 to bend outwardly within slot 48 to form passage region 62 locally increased in cross sectional size relative to adjacent region 64. The locally increased passage size may optionally be developed (or that provided by choke bar 47 as just described may be augmented) forwardly of choke bar 47 in the direction of extrusion by bending a predetermined lateral zone of one or both slot-defining lips 32, 34 outwardly relative to adjacent lip sections in generally the same manner as described for choke bar 47. This may be accomplished by manually forcibly deflecting such lip zone about a hinged area of decreased thickness with an adjustable die lip control system, not shown. Movement of these members (i.e. bar 47 and local portions of the lips) in the manner described are on the order of a few thousandths of an inch.

Cutting means 22 (FIGS. 1 and 2) comprises an industrial robot, exemplarily illustrated at 66, having rotatable stub shaft 68 adapted to be program controlled in rotative movement by a conventional computer system, not shown. Robot arm 70 (FIG. 2) secured to shaft 68 pivotably supports link arm 72 on its forward end at 74. Arm 72 carries downwardly directed high pressure impingement cutting mechanism 78 which in working position faces the underlying path of forward movement of sheet 12 through the system. Cutting mechanism 78 via hose 80 is operatively associated with a source (not shown) of high pressure (e.g. 40,000 psi) water adapted, as exemplarily shown by cutting stream 81, to impinge with sufficient force to penetrate through predetermined portions of sheet 12 to form a blank 24. Alternative forms of cutting means 22 may be used as long as functional to successively cyclically sever sections forming a blank 24 out of sheet 12 in a manner to be further described.

Conventional rotating winder assembly 84 (FIG. 3) synchronously linked with the drive means turning pull roll 20a is downstream of cutting means 22 for maintaining tension in the sheet as it passes through the system and winding scrap sheet 82 on itself after blanks 24 have been cut from sheet 12.

The process for forming blanks 24 using apparatus 10 comprises sequential steps the first of which includes extruding plasticized polyvinyl butyral melt from die 11 by forcing such melt through slot 16 where it is shaped into endless, distortable sheet 12 initially having substantially parallel edges 88, 90. On exiting slot 16 the polymer of sheet 12 is at elevated temperature as a result of energy input in the upstream extrusion system which melts and causes the polymer to flow. Sheet 12 preferably contains integral gradient color band 46 adjacent one edge 90 which is graduated in color intensity from relatively deep adjacent edge 90 fading to extinction at laterally inward cut off line 94. Color band 46 is formed by feeding a colored secondary flow of molten plasticized polyvinyl butyral polymer to and through an extrusion slot in probe 42 at substantially the same temperature and viscosity as that of the main flow of molten polymer in manifold 30 of extrusion die 11. Both the main flow and colored secondary flow are simultaneously extruded at different velocities toward the outlet slot 16 such that a layer of colored melt is completely encapsulated in the main flow of polymer. Further details of such encapsulation and extrusion are disclosed in U.S. Pat. No. 4,316,868 which as indicated is in part incorporated herein by reference.

Conventional techniques known to those skilled in the art may be employed in association with the extrusion process to produce a rough surface on one or both sides of the extruding sheet. These involve the specification and control of one or more of the following: polymer molecular weight distribution, water content of the melt, melt and die exit temperature, die exit geometry etc. Systems describing such techniques are disclosed in U.S. Pat. Nos. 2,904,844; 2,909,810; 3,994,654; 4,575,540 and published European Application No. 0185,863.

Because of the increased mass flow rate of melt occurring as a result of the increased cross section of region 62 of passage 40 provided via the preset positioning of choke bar 47 as previously described, integrally formed zone 96 of sheet 12 is locally increased in thickness relative to the laterally adjacent portion containing color band 46. Thus, melt forming zone 96 of sheet 12 to be stretched the most under the influence of rolls 20 in a manner to be described, has an initial thickness after extrusion on issuing from the die opening and before stretching which is greater than that containing color band 46 along the opposite side of the sheet.

Immediately after (and conceivably just before) issuing from the opening at the forward end of slot 16, the pendant sheet is pulled into frictional shaping engagement with a preselected portion of the perimeter of rotating frusto-conical pull roll 20a which is driving roll 20b at the same rotative speed. In so doing the side of the sheet containing increased thickness zone 96 is stretched and drawn under the influence of enlarged diameter portions 99, 100 of rolls 20. Stretching while the sheet is at elevated temperature commences essentially at the point of exit from slot 16 and continues during the brief interval before and during contact with the surface of lower roll 20a. Stretching occurs because points slant height of the conical surface of roll 20a with which the distortable sheet is in contact are moving at different velocities and thus apply different forces to the sheet across its width. Thus, the enlarged diameter end of the cone turning at a greater surface speed than the other end stretches and thins the initially locally thick zone 96 of the sheet to a greater degree than the portion of the sheet containing color band 46 in contact with the smaller end of the cone. The radius of curvature of the shaped distorted sheet is controlled and conveniently changed by adjusting the position of the sheet along the slant height of lower frusto-conical roll 20a. The construction center of roll 20a is schematically shown as 101 in FIG. 2 which represents the intersection of the axis of rolls 20a and 20b. The curvature of the sheet along the side of smaller radius for typical commercial windshields of complex curvature should be within a range of 50-300 in (152-762 cm).

Thus, as extrusion through die 11 continues the side of the sheet containing increased thickness zone 96 is stretched more than the other side containing color band 46 primarily under the influence of the enlarged diameter portion of roll 20a. This reshapes the sheet from an initial configuration with substantially parallel edges on issuing from slot 16 into an arcuate form (FIG. 2) extending in the forward direction of extrusion. This stretching pattern reduces the thickness of zone 96 to that of the rest of the sheet to provide a substantially uniform thickness sheet 12 after passage through nip 97, possessing a different radii along each edge, that of greater radius being along the side formed from the greater thickness melt.

Figure 4:
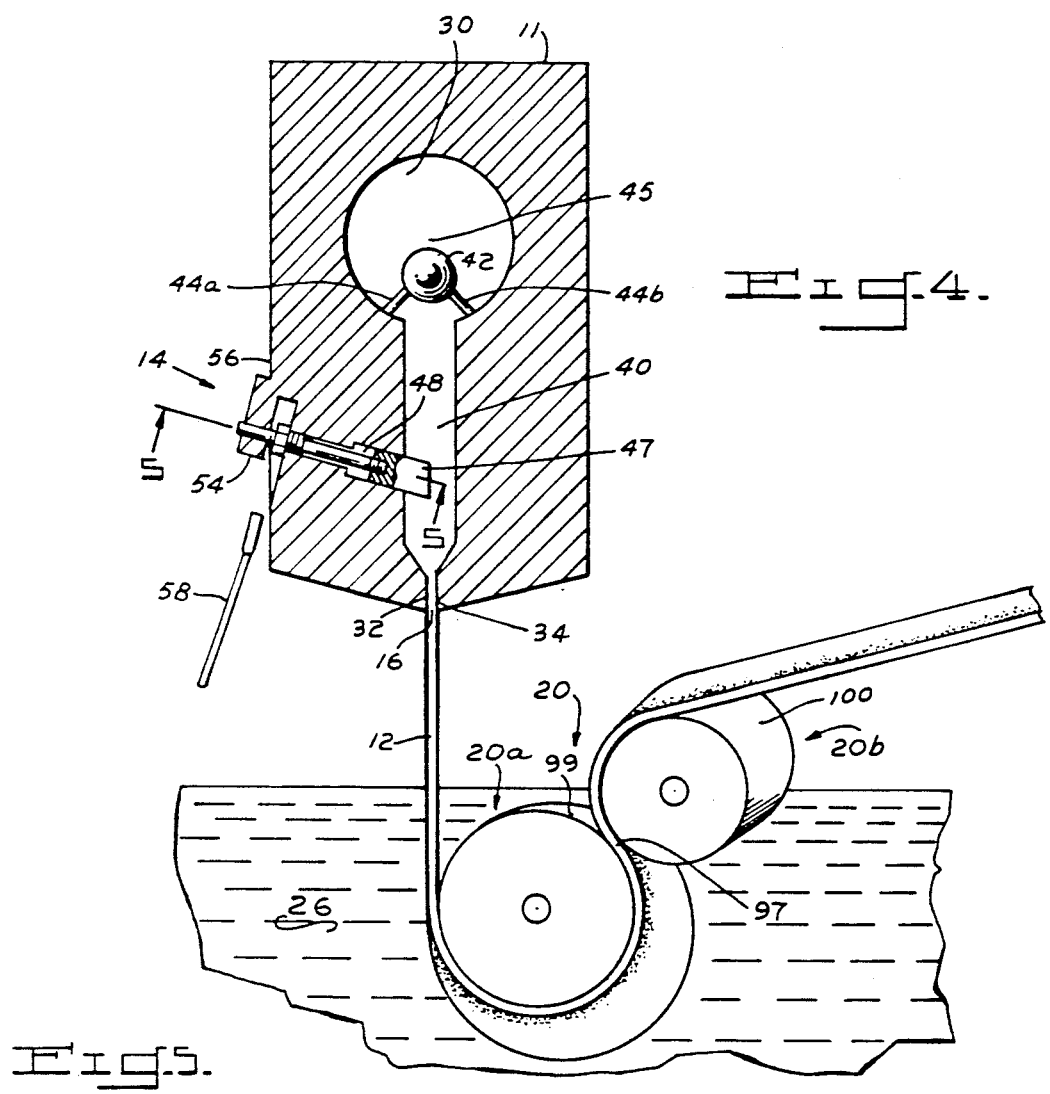
FIG. 4 is a schematic view in partial section along 4—4 of FIG. 2.
Figure 5:
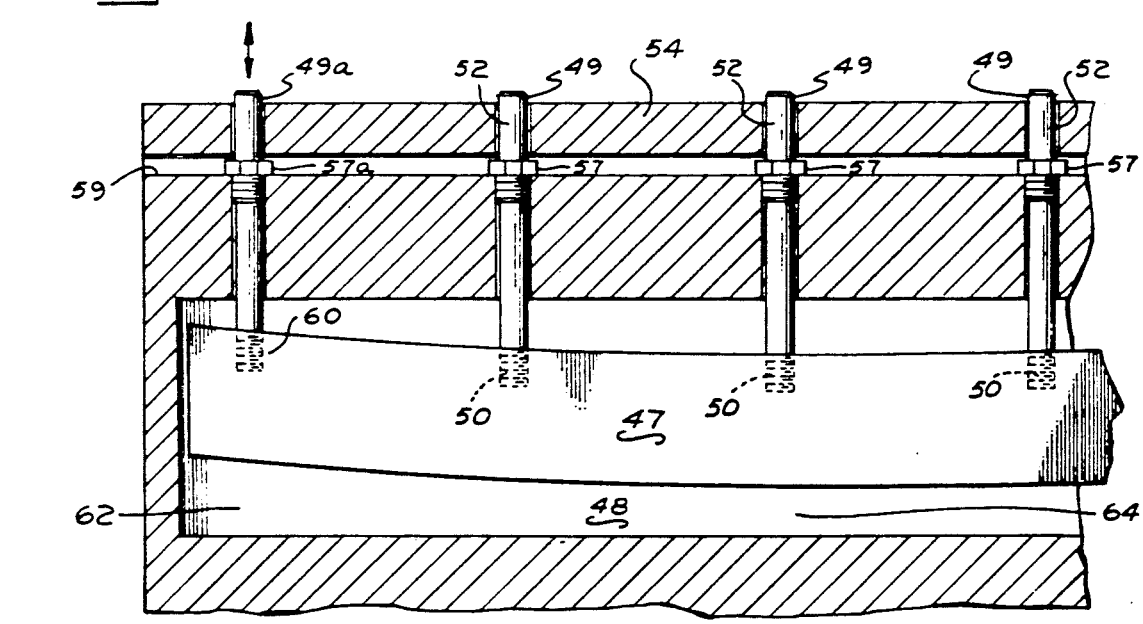
FIG. 5 is a sectional view along 5—5 of FIG. 4.

As shown in FIG. 4, by directing the sheet downwardly into cooling bath 26, sheet 12 is quenched and reduced in temperature to at least partially set the polymer and promote retention of the roughened surfaces previously formed during extrusion prior to passage around roll 20a and through nip 97.

After leaving contact with rolls 20 and emerging from bath 26, the shape-stable sheet may be directed off-line (not shown) and accumulated, for example by winding on a conical core having substantially the same conical taper as roll 20a, for later unwinding and cutting into discrete blanks. Since the sheet has already been shaped and its gage distribution is therefore substantially uniform, the off-line blanks formed with this embodiment should be equal in quality to those formed with the in-line embodiment now to be described.

The shaped sheet is advanced through tension applied by winder assembly 84 or equivalent to the cutting station preferably along a forwardly curved arcuate path substantially corresponding in curvature to the arcuate contour of the shaped sheet. One or more conical rolls 102, 104 may be provided as necessary for supporting the sheet during such movement.

While the sheet passes through the cutting station, cutting mechanism 78 which is synchronously tuned in timed relation to the advancing movement of the sheet, traverses a path corresponding to the desired peripheral pattern of a blank 24. High pressure water cutting stream 81 issuing from such moving mechanism 78 sequentially impinges on and penetrates through sheet 12 to cut blank 24 therefrom, which then falls by gravity through an opening in an underlying support table (not shown) onto blank stack 109. More particularly, arcuately shaped quadrilateral sections are sequentially cut out of sheet 12 which each have a gradient color band extending along one longitudinal side to form such blanks. As apparent from FIG. 2, each severed section will have longitudinal curved edges 110, 112 generally parallel to the outer curved edges of the previously distorted sheet. The peripheral contour of each blank is designed to substantially exactly match that of the panel(s) with which it will be later laminated to form a windshield of complex curvature. Alternatively, to simplify the on-line cutting step, straight-sided blanks (e.g. trapezoidal-shaped) may be cut from the sheet on-line and then further trimmed off-line by an auxiliary cutting means, not shown, to the final arcuately shaped quadrilaterial configuration.

Scrap web 82 having successive, large through-holes corresponding in profile to those of the blanks is wound on itself (FIG. 3) by winder assembly 84 for later comminuting in conventional manner and eventual reuse as a portion of the feed to the upstream extrusion system.

The following working example is for illustration only and should not be taken in a limited sense.

EXAMPLE

Polyvinyl butyral polymer commercially available from Monsanto Company as Butvar ® resin was mixed with dihexyl adipate plasticizer (32.5 phr) in a high intensity batch mixer and charged continuously to a vented worm extruder (32/1 L/D). Melt at about 400° F. (204° C.) and 3,000-5,000 psi (20.67-34.45 MPa) at the extruder outlet was end fed at 276 lbs (125 kg) per hr to a sheeting die of the type shown in FIG. 4, i.e. polymer at 635 psi (4.38 MPa) entered cylindrical manifold 30 in a direction parallel to axis 45. A 28 in (71 cm) wide sheet having a surface roughness of $45-65 \times 10^{-5}$ in ($114-165 \times 10^{-5}$ cm) on each side issued vertically downwardly from the die, such roughness measured after the sheet had passed through the cooling bath and the nip between rolls 20. Integrally formed in the sheet was an 8.25 in (20.96 cm) wide colored gradient band measured in a direction perpendicular to that of extrusion. To determine the difference in mass flow rate across the die outlet slot, the extruding sheet was temporarily manually pulled from the outlet and immediately introduced into a 55° F. (12.8° C.) subjacent water bath and samples across the width of the sheet taken for thickness measurement. As a result of the choke bar setting upstream of the die lips and the associated manual adjustment of the position of portions of the die lips, the mass flow rate of melt was greater on the side of the sheet opposite that containing the gradient band. This was evident in a gradual progressive increase in thickness across the full width of the sheet starting from the side of least thickness adjacent the outer limit of the color band. The instantaneous average thickness of the sheet across its full width measured off-line in samples collected at a particular time during the run was 35.3±9 mils (0.09±0.02 cm), with the thickness along the side containing the gradient band being about 26 mils (0.07 cm) and that adjacent the opposite clear side being about 43 mils (0.11 cm). After thus measuring the thickness profile, the sheet was redirected around a pair of rotating metal-surfaced frusto-conical pull rolls immersed in and at substantially the same temperature as the water bath immediately below the die. The lower roll was three ft (0.9 m) long and had 10 in (25.4 cm) and 16.5 in (41.9 cm) diameters respectively at its small and enlarged ends. The surface speed was 11 ft (3.4 m) per min at the small end of rotating roll 20 and 14 ft (4.3 m) per min at its enlarged end. The vertical distance between the lower end of the die lips and the upper level of the water was about 2 in (5.1 cm). While melt continued to issue from the die slot, the greater thickness clear side of the sheet engaged the faster moving cone surface portion while the gradient side was wound around the opposite slower moving surface portion. The velocity gradient across the sheet because of the lower pulling action of the uneven diameter rolls was visually noticeable in the sheet at the exit of the die slot. The initial substantially vertically straight-sided sheet passing around frustoconical roll 20a and through nip 97 was distorted in the manner described into a curved shape with a measured 60 in (152 cm) radius of curvature along the edge adjacent the gradient band and, though not measured, an estimated different, significantly greater radius of curvature along the other edge of about 60+28=88 in (223.5 cm). These dimensions approximate those typically required in an interlayer for a commercial windshield of complex curvature. Sections of the distorted sheet were manually cut crosswise of the direction of extrusion and thickness measured. The average thickness of the originally uneven thickness sheet described above, measured at a subsequent point in the run, was substantially uniform at 29.2±0.75 mils (0.074±0.002 cm). The thickness and width of the curved sheet was found to be a function of extrusion rate, rotative speed of the lower frusto-conical roll and the angle of the cone (slant height of the roll) relative to the position of the sheet on the cone.

The method of the invention is capable of providing a cut blank of plasticized polyvinyl butyral shaped in general conformance with the shape of a windshield of complex curvature and which has high quality performance characteristics insofar as not significantly varying in thickness across its width. Since shaping occurs while the plastic is substantially at elevated extrusion temperature and is therefore substantially stress-free, on reheating during laminating such blank should be shrink-stable and remain dimensionally accurate. Moreover, additives to enhance sheet performance incorporated into the plastic formulation charged to the extruder should not flash out of the sheet since post-forming during laminating can be avoided.

The preceding description is set forth for purposes of illustration only and is not to be taken in a limited sense. Various modifications and alterations will be readily suggested to persons skilled in the art. It is intended therefore that the foregoing be considered as exemplary only and that the scope of the invention be ascertained from the scope of the following claims.

We claim:

1. A process for forming plasticized polyvinyl butyral sheet which comprises: continuously forcing plasticized polyvinyl butyral melt through a slot while incorporating a colored stream of plasticized polyvinyl butyral into the melt upstream of the slot to form a sheet having a gradient color band extending along one side, the mass flow rate of melt through one region of the slot being greater than through the remainder of the slot; radially forwardly distorting the side of the sheet opposite the side containing the color band to form a curved shape of substantially uniform thickness having a different radius of curvature along each edge while the melt continues to issue from the slot, the edge of greater radius of curvature being formed from the region of the sheet formed from the melt issuing through the slot at the greater mass flow rate and passing the sheet through a cooling bath after issuing from the slot to set the plastic thereof.

2. The process of claim 1 wherein the colored stream is incorporated into the melt which is to form the region of the sheet formed from the melt issuing from the slot at the lesser mass flow rate.

3. The process of claim 1 wherein the sheet is distorted by engagement with the conical surface of a pull roll.

4. The process of claim 3 wherein the sheet is at least partially engaged with said roll while within the cooling bath.

5. The process of claim 4 wherein the melt issuing from the slot gradually increases in thickness in a direction perpendicular to the melt flow toward the edge of the sheet having the greater curvature after distortion.

6. The process of claim 4 including the step of successively cutting discrete interlayer sections out of the continuous curved sheet which have longitudinal curved edges substantially parallel to those of the continuous distorted sheet.

7. The process of claim 6 wherein cutting occurs as the sheet continues to advance forwardly.

* * * * *